US010406642B2

United States Patent
Chen et al.

(10) Patent No.: US 10,406,642 B2
(45) Date of Patent: Sep. 10, 2019

(54) DUAL DRIVE PRESSING APPARATUS FOR PLURAL PRESSING HEADS

(71) Applicant: Teco Image Systems Co., Ltd., Taipei (TW)

(72) Inventors: Chien-Ying Chen, Taipei (TW); Chien-Min Chen, Taipei (TW); Ken-Te Chou, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 105 days.

(21) Appl. No.: 15/819,844

(22) Filed: Nov. 21, 2017

(65) Prior Publication Data

US 2019/0121372 A1   Apr. 25, 2019

(30) Foreign Application Priority Data

Oct. 25, 2017 (TW) .............. 106136657 A

(51) Int. Cl.
*G05D 3/12* (2006.01)
*B23Q 1/25* (2006.01)
*G05D 15/01* (2006.01)

(52) U.S. Cl.
CPC .............. *B23Q 1/25* (2013.01); *G05D 3/125* (2013.01); *G05D 15/01* (2013.01)

(58) Field of Classification Search
CPC .......... G05D 3/125; G05D 15/01; B23Q 1/25; B23Q 1/26
See application file for complete search history.

(56) References Cited

U.S. PATENT DOCUMENTS 4,131,033 A   12/1978 Wright et al.
5,509,192 A * 4/1996 Ota ...................... H01R 43/205
                                                 29/703

FOREIGN PATENT DOCUMENTS

CN   101571729 B   7/2012
JP   2015159111 A   9/2015
TW       186899   7/1992

* cited by examiner

*Primary Examiner* — Adam D Rogers
(74) *Attorney, Agent, or Firm* — Kirton McConkie; Evan R. Witt

(57) ABSTRACT

A dual drive pressing apparatus for plural pressing heads is disclosed. The dual drive pressing apparatus includes a platform, a first rotation plate, a second rotation plate, a return set and a switch set. While the first rotation plate is driven by a first driving force, the first rotation plate rotates with the second rotation plate to a selectively specific angle relative to the platform, and the set of pressing columns is selectively aligned with a corresponding pressing head. While a second driving force is provided by the switch set to resist the resilience of the return set and push against the end of the supporting cylinder to move towards the second surface, the supporting cylinder of the second rotation plate drives the fourth surface separated from the first rotation plate, and the set of pressing columns on the third surface pushes the corresponding pressing head set.

13 Claims, 12 Drawing Sheets

DUAL DRIVE PRESSING APPARATUS FOR PLURAL PRESSING HEADS

FIELD OF THE INVENTION

The present invention relates to a pressing apparatus, and more particularly to a dual drive pressing apparatus for plural pressing heads.

BACKGROUND OF THE INVENTION

A mechanical pressing head is a simple switch mechanism and usually used for controlling machines or processes. Such mechanical pressing heads have been widely used in a variety of fields. With a pressing action of the pressing head for its corresponding object, a specific program of the object can be started to perform.

At present, some apparatuses employ plural pressing heads, and plural objects, which need to be pressed, can be installed in the apparatuses. The plural objects are replaceable and disposed to align with the corresponding pressing heads respectively. While the apparatus is implemented in an operation application, the pressing actions of the pressing heads can be combined and adjusted according to the application function of the apparatus. Consequently, the mechanism of driving plural pressing heads are more difficult and complicated. For example, while plural pressing heads are employed to press plural corresponding objects needing to be pressed in an apparatus, and more particular for a case where there are more than four objects needing to be pressed, it is necessary to provide the pressing heads and the driving motors having the same number as that of the objects for accomplishing several combinations of the pressing actions of the plural pressing heads to press the plural corresponding objects. Moreover, plural driving motors are controlled to drive the pressing actions of the pressing heads, respectively. Consequently, it results in a complicated structure, the cost is increased and the volume fails to be reduced.

In some practical embodiments, the apparatus employs two pressing heads and a reversing mechanism and a motor are employed to drive the two pressing heads. However, while the apparatus employs more than two pressing heads, the number of the motors employed to drive the pressing heads increases accompanying with the number of the pressing heads. Consequently, the size of the entire structure, the complexity of the transmission mechanism and the cost are increased.

Therefore, there is a need of providing a dual drive pressing apparatus for plural pressing heads to overcome the above drawbacks.

SUMMARY OF THE INVENTION

An object of the present invention is to provide a dual drive pressing apparatus for plural pressing heads. The pressing apparatus has two driving forces implemented to execute a pressing action and a switching of the pressing positions, so as to achieve the purposes of driving at least one set of pressing columns by two driving force to selectively press plural pressing heads.

Another object of the present invention is to provide a dual drive pressing apparatus for plural pressing heads. The divided sets, the number and the positions of the pressing columns in the dual drive pressing apparatus are designed respect to the number and the positions of the plural pressing heads. By employing two driving forces, several pressing actions in different configurations are integrated effectively. Consequently, the efficiency of pressing operations is improved, the entire structure is simplified, the size of the apparatus is reduced, the cost is reduced and the reliability is enhanced.

In accordance with an aspect of the present invention, there is provided a dual drive pressing apparatus for plural pressing heads. The dual drive pressing apparatus includes a platform, a first rotation plate, a second rotation plate, a return set and a switch set. The platform includes a first surface, a second surface and a shaft hole. The first surface and the second surface are opposite to each other. The first rotation plate includes a pivot portion, a through hole and a first connection set. The first rotation plate is pivotally connected with the platform by the pivot portion, the through hole passes through the pivot portion and aligns with the shaft hole, and the first connection set is disposed on the first rotation plate. The second rotation plate is mounted on the first rotation plate and includes a third surface, a fourth surface, a second connection set, a supporting cylinder and at least one set of pressing columns. The third surface and the fourth surface are opposite to each other, and the at least one set of pressing columns is disposed nearby the edge of the third surface. The supporting cylinder includes a first end and a second end, the first end and the second end are opposite to each other, the first end is connected with the fourth surface, and the second end of the supporting cylinder passes though the though hole and the shaft hole along a direction from the third surface to the fourth surface. The first rotation plate and the second rotation plate are pivotally connected with the platform. The first connection set and the second connection set are relative to each other, and the first connection set is connected to the second connection set. While the first rotation plate drives the second rotation plate to rotate, the fourth surface of the second rotation plate is limited to move toward or away the first rotation plate. While the first rotation plate is driven by a first driving force, the first rotation plate rotates with the second rotation plate to a selectively specific angle relative to the platform, and the at least one set of pressing columns correspondingly is aligned with a corresponding pressing head set selected from the plural pressing heads. The return set is constructed between the first rotation plate and the second rotation plate and configured to force the fourth surface of the second rotation plate towards the first rotation plate. The switch set is connected to the second end of the supporting cylinder. While a second driving force is provided by the switch set to push against the second end of the supporting cylinder to move towards the second surface, the supporting cylinder of the second rotation plate drives the fourth surface separated from the first rotation plate, and the at least one set of pressing columns on the third surface pushes the corresponding pressing head set selected from the plural pressing heads.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
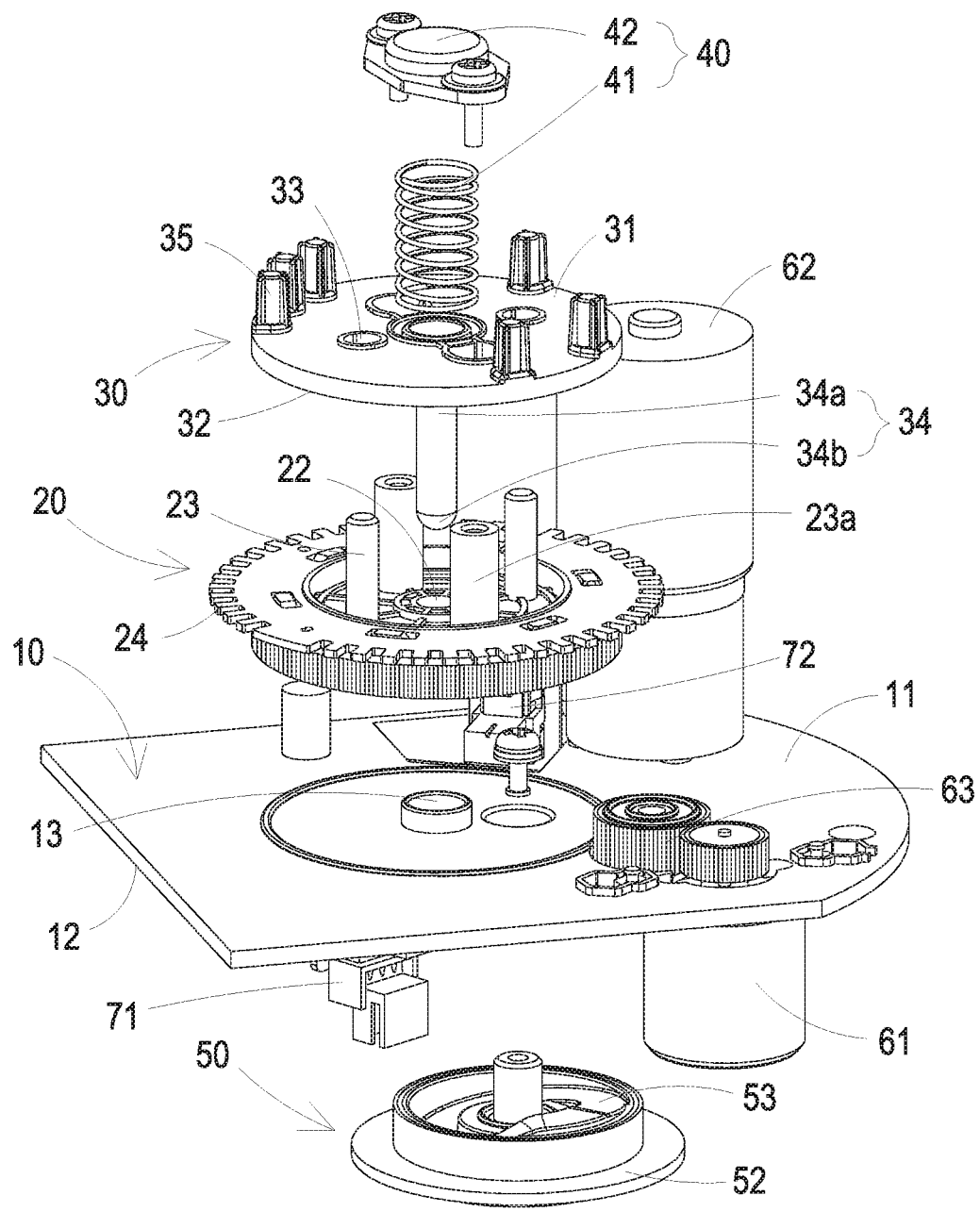
FIG. 1A is an exploded view illustrating a dual drive pressing apparatus according to a first preferred embodiment of the present invention.
Figure 1B:
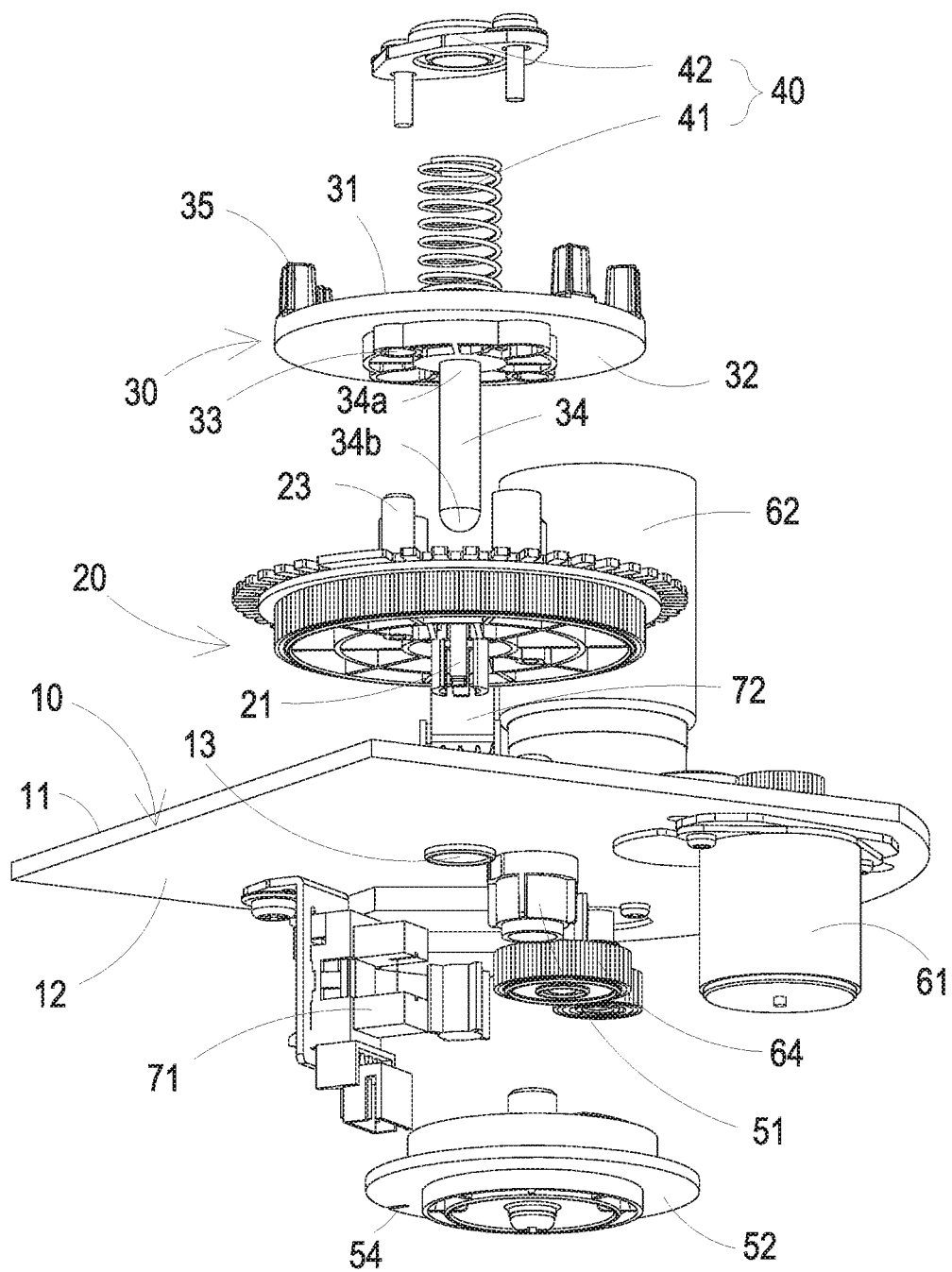
FIG. 1B is an exploded view illustrating the dual drive pressing apparatus from another perspective angle according to the first preferred embodiment of the present invention.
Figure 2A:
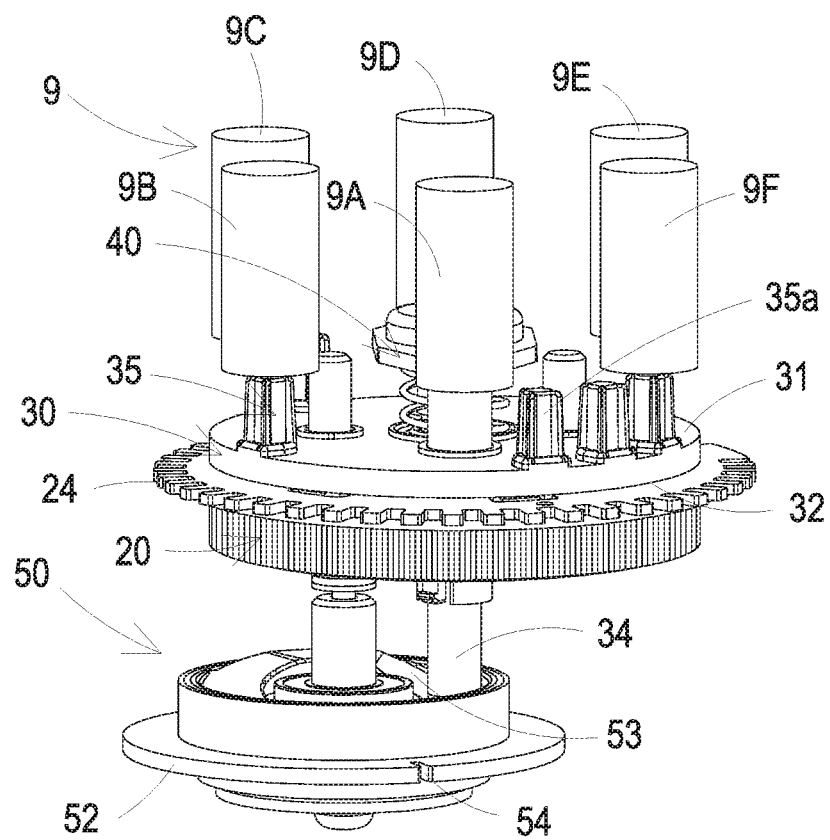
FIG. 2A is a perspective view illustrating a first exemplary status of the dual drive apparatus of FIG. 1A employed for plural pressing heads.
Figure 2B:
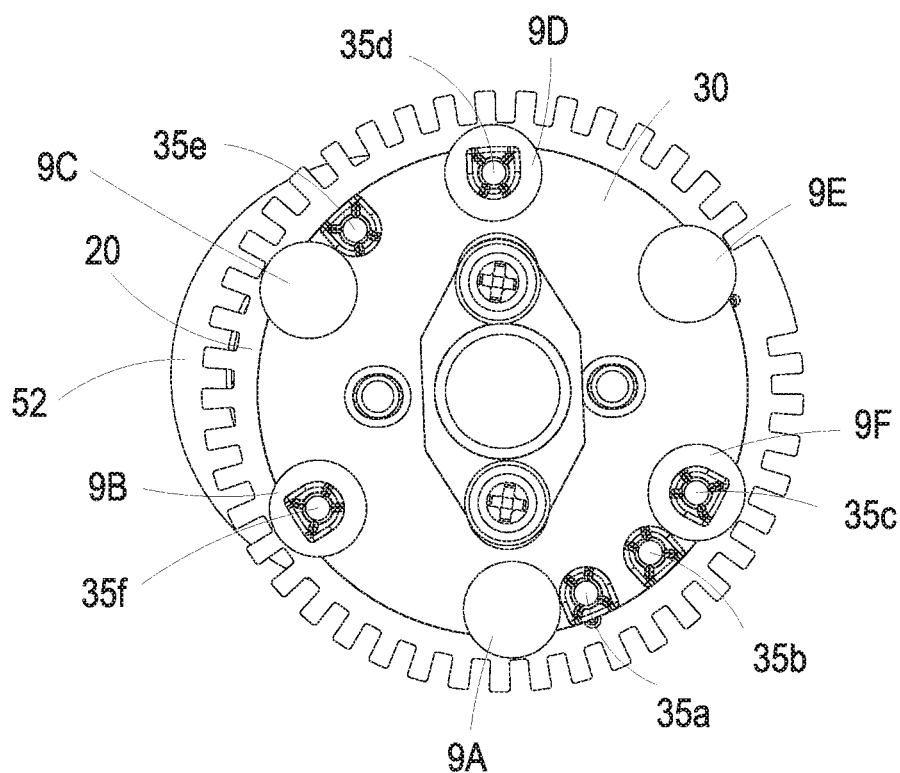
FIG. 2B is a top view of FIG. 2A.
Figure 2C:
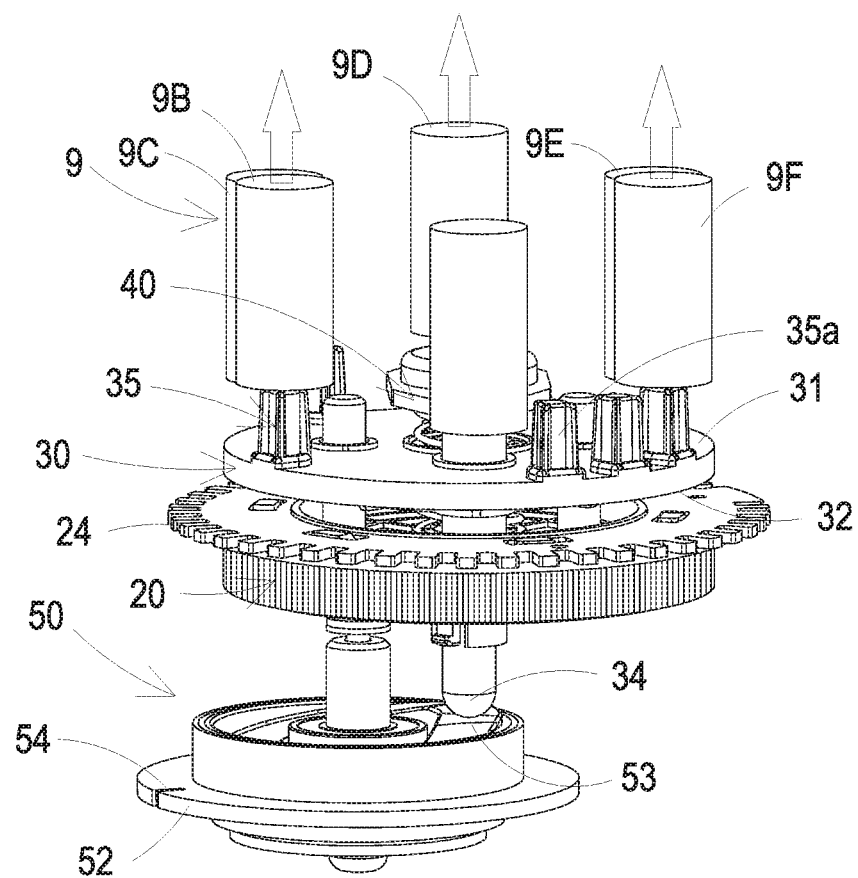
FIG. 2C is a perspective view illustrating a second exemplary status of the dual drive apparatus of FIG. 1A employed for plural pressing heads.
Figure 3A:
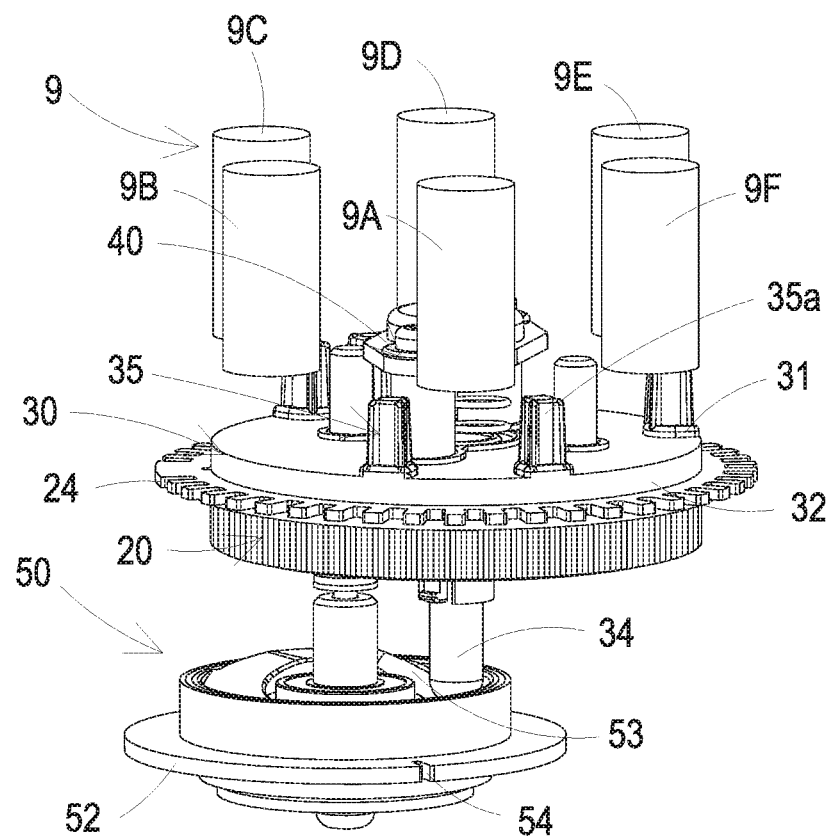
FIG. 3A is a perspective view illustrating a third exemplary status of the dual drive apparatus of FIG. 1A employed for plural pressing heads.
Figure 3B:
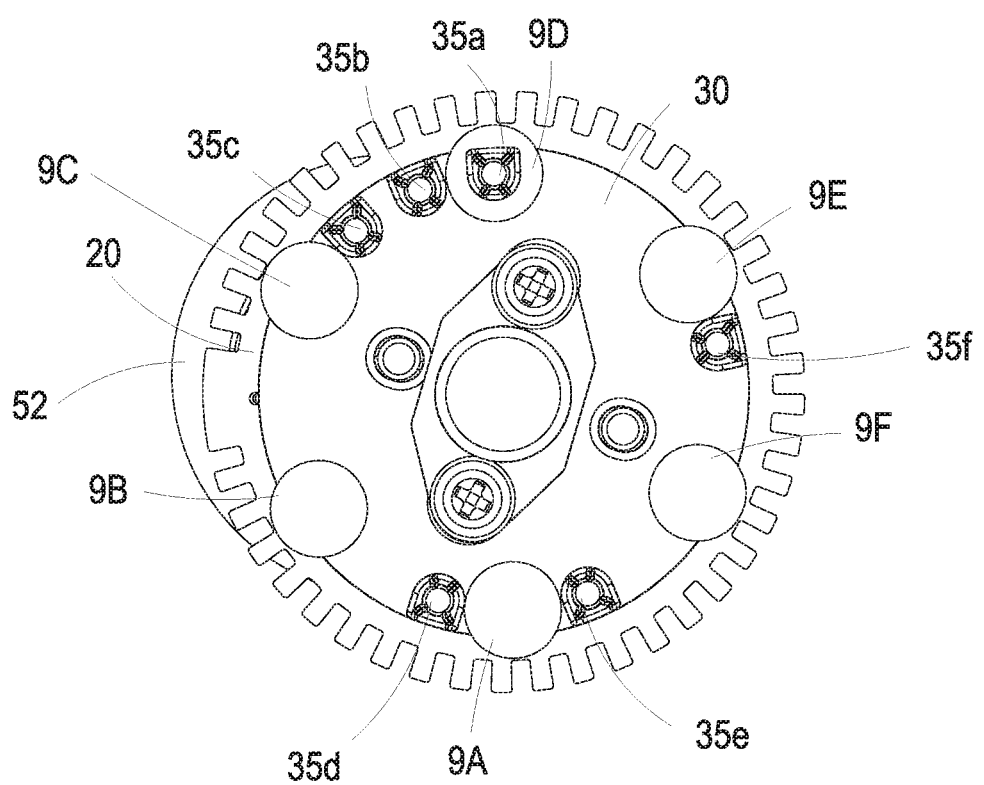
FIG. 3B is a top view of FIG. 3A.
Figure 3C:
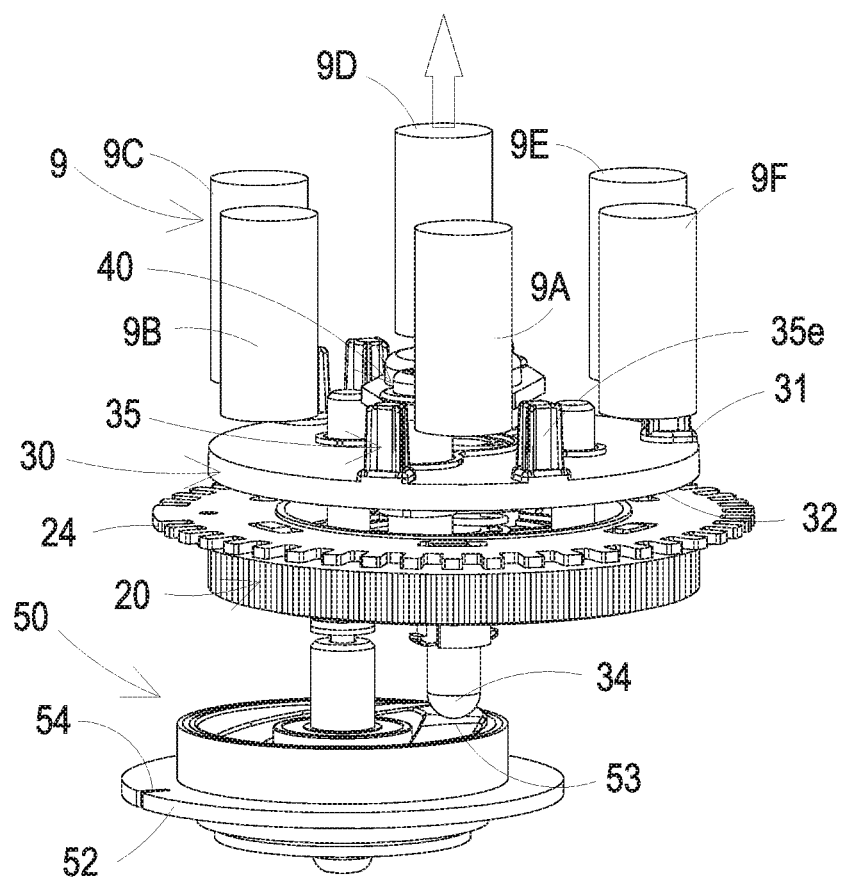
FIG. 3C is a perspective view illustrating a fourth exemplary status of the dual drive apparatus of FIG. 1A employed for plural pressing heads.

FIG. 1A is an exploded view illustrating a dual drive pressing apparatus according to a first preferred embodiment of the present invention. FIG. 1B is an exploded view illustrating the dual drive pressing apparatus from another perspective angle according to the first preferred embodiment of the present invention. FIG. 2A is a perspective view illustrating a first exemplary status of the dual drive apparatus of FIG. 1A employed for plural pressing heads. FIG. 2B is a top view of FIG. 2A. FIG. 2C is a perspective view illustrating a second exemplary status of the dual drive apparatus of FIG. 1A employed for plural pressing heads. FIG. 3A is a perspective view illustrating a third exemplary status of the dual drive apparatus of FIG. 1A employed for plural pressing heads. FIG. 3B is a top view of FIG. 3A. FIG. 3C is a perspective view illustrating a fourth exemplary status of the dual drive apparatus of FIG. 1A employed for plural pressing heads. In the embodiment, the dual drive pressing apparatus 1 is used to drive plural pressing heads 9. The dual drive pressing apparatus 1 includes a platform 10, a first rotation plate 20, a second rotation plate 30, a return set 40, and a switch set 50. In the embodiment, the platform 10 includes a first surface 11, a second surface 12 and a shaft hole 13. The first surface 11 and the second surface 12 are opposite to each other. The first rotation plate 20 includes a pivot portion 21, a through hole 22 and a first connection set 23. The first rotation plate 20 is pivotally connected with the platform 10 through the pivot portion 21. The through hole 22 passes through the pivot portion 21 and aligns with the shaft hole 13 of the platform 10. In the embodiment, the pivot portion 21 can be for example but not limited to a detachable sleeve. It is not an essential feature to limit the present disclosure, and not redundantly described herein. In addition, the first connection set 23 is disposed on the first rotation plate 20. The second rotation plate 30 is mounted on the first rotation plate 20 and includes a third surface 31, a fourth surface 32, a second connection set 33, a supporting cylinder 34 and at least one set of pressing columns 35. The third surface 31 and the fourth surface 32 are opposite to each other. The at least one set of pressing columns 35 is disposed nearby the edge of the third surface 31. The supporting cylinder 34 includes a first end 34a and a second end 34b. The first end 34a and the second end 34b are opposite to each other. The first end 34a is connected with the fourth surface 32, and the second end 34b of the supporting cylinder 34 passes though the though hole 22 and the shaft hole 13 along a direction from the third surface 31 to the fourth surface 32. The first rotation plate 20 and the second rotation plate 30 are pivotally connected with the platform 10. The first connection set 23 and the second connection set 33 are relative to each other, and the first connection set 23 is connected to the second connection set 33. Consequently, the first rotation plate 20 rotates with the second rotation plate 30, and the fourth surface 32 of the second rotation plate 30 can be moved towards or away the first surface 11 of the platform 10. In the embodiment, the first connection set 23 can be for example but not limited to plural positioning pins, and the second connection set 33 can be for example but not limited to plural positioning holes. Moreover, the positioning pins and the positioning holes are relative to each other, respectively, and each of the plural positioning pins includes an end inserted in the corresponding positioning hole. Consequently, the first rotation plate 20 drives the second rotation plate 30 to rotate synchronously. Furthermore, the movement of the second rotation plate 30 relative to the first rotation plate 20 is limited. Namely, it is employed to achieve the purpose of moving the fourth surface 32 of the second rotation plate 30 towards or away the first surface 11 of the platform 10. In addition, the return set 40 is constructed between the first rotation plate 20 and the second rotation plate 30, so as to provide a resilience to force the fourth surface 32 of the second rotation plate 30 towards the first rotation plate 20. In the embodiment, the return set 40 includes a spring 41 and a position-limitation portion 42. The position-limitation portion 42 is constructed on the first rotation plate 20. For example, the position-limitation portion 42 is connected with ends of the first connection set 23a (i.e. position pins) and the spring 41 is clamped between the position-limitation portion 42 and the third surface 31 of the second rotation plate 30, so as to provide the resilience to keep the fourth surface 32 of the second rotation plate 30 towards the first rotation plate 20. It is emphasized that the foregoing return set 40 constructed by the spring 41 and the position-limitation portion 42 is illustrative merely. Any of the return set connected between first rotation plate 20 and the second rotation plate 30 and configured to provide the resilience to keep the fourth surface 32 of the second rotation plate 30 towards the first rotation plate 20 can be employed in the present disclosure. The related applications are not redundantly described herein.

In the embodiment, while the first rotation plate 20 is driven by a first driving force, the first rotation plate 20 drives and rotates with the second rotation plate 30 to a selectively specific angle relative to the platform 10, and the at least one set of pressing columns 35 correspondingly is aligned with a corresponding pressing head set selected from the plural pressing heads 9. For example, the dual drive pressing apparatus 1 is performed and switched from the first exemplary statue of FIG. 2A to the third exemplary status of FIG. 3A, or from the third exemplary status of FIG.

3A to the first exemplary status of FIG. 2A. In addition, the dual drive pressing apparatus 1 further includes a switch set 50 connected and contacted with the second end 34b of the supporting cylinder 34. While a second driving force is provided, the switch set 50 pushes against the second end 34b of the supporting cylinder 34 to move towards the second surface 12 of the platform 10. Consequently, the supporting cylinder 34 of the second rotation plate 30 drives the fourth surface 32 separated from the first rotation plate 20, and the at least one set of pressing columns 35 on the third surface 31 pushes the corresponding set of the pressing heads 9. For example, the dual drive pressing apparatus 1 is performed and switched from the first exemplary statue of FIG. 2A to the second exemplary status of FIG. 2C, or from the third exemplary status of FIG. 3A to the fourth exemplary status of FIG. 3C. It is emphasized that when the dual drive pressing apparatus 1 is employed to drive the plural pressing heads 9, a part of the plural pressing heads 9 can be selectively pressed. The present disclosure is not limited to the foregoing embodiments, and the related applications are detail described as the following.

In the embodiment, the switch set 50 further includes a fixing shaft 51 and a third rotation plate 52. The fixing shaft 51 includes first end connected to the second surface 12 of the platform 10. The third rotation plate 52 is pivotally connected with a second end of the fixing shaft 51 and includes an inclined plane 53 connected and contacted with the second end 34b of the supporting cylinder 34. While the return set 40 forces the fourth surface 32 of the second rotation plate 30 to attach with the first rotation plate 20, the second end 34b of the supporting cylinder 34 pushes against the inclined plane 53 and the third rotation plate 52 is positioned at a first position. For example, the dual drive pressing apparatus 1 is performed and switched into the first exemplary statue of FIG. 2A or the third exemplary status of FIG. 3A. On the other hand, while the third rotation plate 52 is driven by the second driving force and rotates around the fixing shaft 51 to a second position, the third rotation plate 52 drives the inclined plane 53 to push against the second end 34b of the supporting cylinder 34. Consequently, the supporting cylinder 34 of the second rotation plate 30 drives the fourth surface 32 separated from the first rotation plate 20 or away the first surface 11 of the platform 10, and the at least one set of pressing columns 35 on the third surface 31 pushes the corresponding pressing head set selected from the plural pressing heads 9. For example, the dual drive pressing apparatus 1 is performed and switched from the first exemplary statue of FIG. 2A to the second exemplary status of FIG. 2C, or the third exemplary statue of FIG. 3A to the fourth exemplary status of FIG. 3C. It is accomplished to selectively press a part of the plural pressing heads 9. It is emphasized that the switch set 50 is not limited to the combination of the fixing shaft 51, the third rotation plate 52 and the inclined plane 53 in the foregoing embodiment. Any of the switch set 50, for example a solenoid valve switch and so on, connected with the second end 34b of the supporting cylinder 34 and driving the supporting cylinder 34 to move against the resilience of the return set 40 can be employed in the present disclosure. The combination of the fixing shaft 51, the third rotation plate 52 and the inclined plane 53 of the present disclosure is more advantage of compacting the structure and simplifying the assembly. Moreover, the entire mechanism is simplified, the size of the apparatus is reduced, the cost is reduced and the reliability is enhanced.

In the embodiment, the dual drive pressing apparatus 1 employed for the plural pressing heads 9 further includes a first driving element 61 and a second driving element 62. The first driving element 61 can be a motor connected to the first rotation plate 20 through for example but not limited to at least a gear set 63. The first driving element 61 is configured to provide the first driving force to drive the first rotation plate 20 with the second rotation plate 30 to rotate around the pivot portion 21. On the other hand, the second driving element 62 can be a motor connected to the third rotation plate 52 through for example but not limited to at least a gear set 64. The second driving element 62 is configured to provide the second driving force to drive the third rotation plate 52 to rotate around the fixing shaft 51. In the embodiment, the motor of the first driving element 61 and the corresponding gear set 63 are disposed on the second surface 12 and the first surface 11 of the platform 10, respectively. The motor of the second driving element 62 and the corresponding gear set 64 are disposed on the first surface 11 and the second surface 12 of the platform 10, respectively. It is emphasized that the form of the first driving element 61 providing the first driving force and the form of the second driving element 62 providing the second driving force are illustrative merely. Any of the first driving element 61 providing the first driving force to drive the first rotation plate 20 and the second rotation plate 30 to rotate and any of the second driving element 62 providing the second driving force to drive the third rotation plate 52 can be applied to the present disclosure, and the related applications are not redundantly described herein.

In addition, in the embodiment, the dual drive pressing apparatus 1 further includes for example a first detecting element 71, and the third rotation plate 52 further includes a mark relative to the first detecting element 71. The mark 54 is disposed on an outer edge of the third rotation plate 52, and the first detecting element 71 is disposed on the platform 10, for example disposed on the second surface 12 of the platform 10 and relative to the mark 54, so as to detect if the third rotation plate 52 is positioned at the foregoing first position or rotated around the fixing shaft 51 to the second position. Moreover, the dual drive pressing apparatus 1 further includes for example a second detecting element 72 and a dial unit 24. The dial unit 24 is disposed around an outer edge of for example but not limited to the first rotation plate 20 or the second rotation plate 30. The second detecting element 72 is disposed on the first surface 11 of the platform 10 and relative to the dial unit 24, so as to detect the specific angle of the first rotation plate 20 and the second rotation plate 30 rotated around the pivot portion 21.

It is noted that the first driving element 61 of the dual drive pressing apparatus 1 is utilized to switch the position of the set of pressing columns 35 to align with the corresponding pressing head set selected from the plural pressing heads 9 for pressing. Moreover, the second driving element 62 of the dual drive pressing apparatus 1 is utilized to drive the set of pressing columns 35 to press the corresponding pressing head set selected from the plural pressing heads 9. Namely, the position of the set of pressing columns 35 corresponding to the corresponding pressing head set selected from the plural pressing heads 9 of the dual drive pressing apparatus 1 can be adjustable according to the practical requirements and accomplish several pressing operations as described in the following exemplary cases.

Firstly, the number of the plural pressing heads 9 can be for example but not limited to 6, and includes the pressing heads 9A, 9B, 9C, 9D, 9E and 9F. The plural pressing heads 9A, 9B, 9C, 9D, 9E and 9F can be disposed in for example but not limited to plural receiving slots (not shown) of a carrying seat, and arranged on an annular path simultaneously. While the second rotation plate 30 of the dual drive pressing apparatus 1 is rotated, the at least one set of pressing columns 35 on the second rotation plate 30 are moved along the annular path where the plural pressing heads 9 arranged thereon. Consequently, while the first rotation plate 20 rotates with the second rotation plate 30 to the specific angle, the set of pressing columns 35 is moved to align with the corresponding pressing head set selected from the plural pressing heads 9. For example, the plural pressing heads 9A, 9B, 9C, 9D, 9E and 9F are arranged clockwisely around a circumference, and each adjacent two of the plural pressing heads 9A, 9B, 9C, 9D, 9E and 9F form an identical central angle, for example 60°. On the other hand, the dual drive pressing apparatus 1 includes at least one set of pressing columns 35. While the second rotation plate 30 drives the pressing column 35 to move along the annular path where the plural pressing heads 9 arranged thereon, and the first rotation plate 20 rotates with the second rotation plate 30 to the specific angle relative to the platform 10, the set of pressing columns 35 is aligned with one of the pressing heads 9.

Figure 4A:
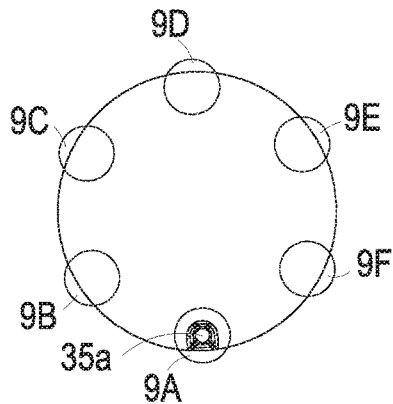
FIGS. 4A to 4F show first to sixth exemplary cases of relative positions between plural pressing heads and a set of pressing columns.
Figure 4B:
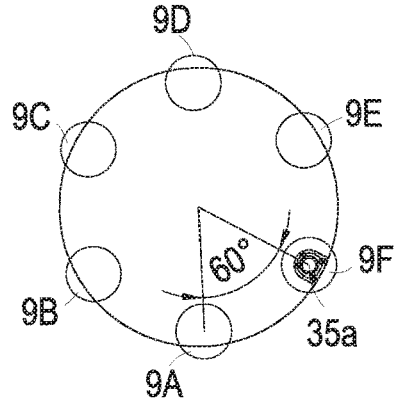
Figure 4C:
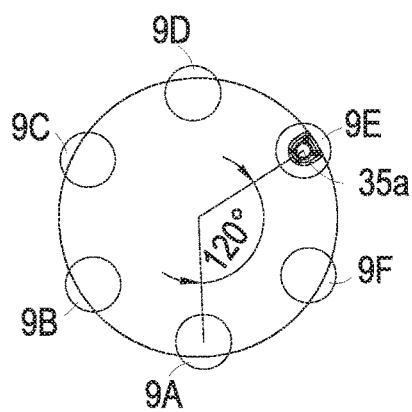
Figure 4D:
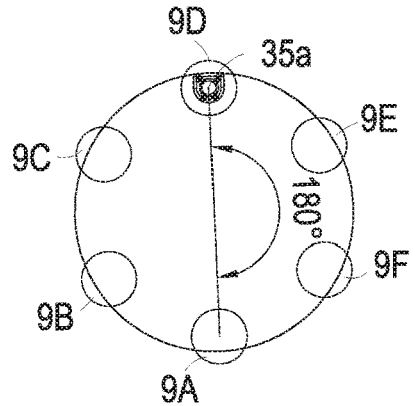
Figure 4E:
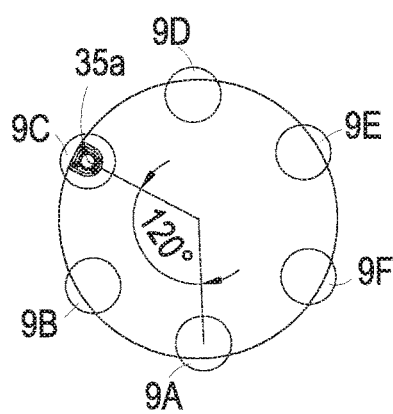
Figure 4F:
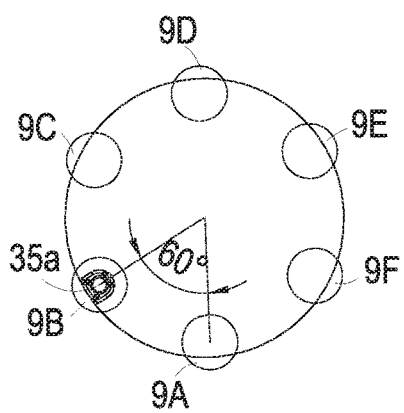

FIGS. 4A to 4F show first to sixth exemplary cases of relative positions between plural pressing heads and a set of pressing columns. FIG. 4A shows the first exemplary case of relative positions between plural pressing heads and the set of pressing columns. As shown in the first exemplary case of FIG. 4A, the set of pressing columns 35 is aligned with the pressing head 9A. While the second driving element 62 drives the switch set 50 to act, the set of pressing columns 35 pushes against the pressing head 9A. Consequently, the pressing head 9A pushes against a corresponding object (not shown) to perform a specific action. If the first exemplary case of FIG. 4A is regarded as an initial status and the first driving force is provided to drive the first rotation plate 20 and the second rotation plate 30 to rotate selectively 60° relative to the platform 10 along a count clockwise direction, the pressing column 35 is rotated to align with the pressing head 9F, as the second exemplary case of FIG. 4B. While the second driving element 62 drives the switch set 50 to act, the pressing column 35 pushes against the pressing head 9F. Consequently, the pressing head 9F pushes against a corresponding object and the corresponding object performs a specific action. Similarly, if the first exemplary case of FIG. 4A is regarded as an initial status and the first driving force is provided to drive the first rotation plate 20 and the second rotation plate 30 to rotate selectively 60° relative to the platform 10 along a count clockwise direction, the set pressing columns 35 is rotated to align with the pressing head 9E, as the third exemplary case of FIG. 4C. While the second driving element 62 drives the switch set 50 to act, the set of pressing columns 35 pushes against the pressing head 9E. Consequently, the pressing head 9E pushes against a corresponding object and the corresponding object performs a specific action. Alternatively, if the first exemplary case of FIG. 4A is regarded as an initial status and the first driving force is provided to drive the first rotation plate 20 and the second rotation plate 30 to rotate selectively 180° relative to the platform 10, the set of pressing column 35 is rotated to align with the pressing head 9D, as the fourth exemplary case of FIG. 4D. While the second driving element 62 drives the switch set 50 to act, the set of pressing columns 35 pushes against the pressing head 9D. Consequently, the pressing head 9D pushes against a corresponding object and the corresponding object performs a specific action. If the first exemplary case of FIG. 4A is regarded as an initial status and the first driving force is provided to drive the first rotation plate 20 and the second rotation plate 30 to rotate selectively 120° relative to the platform 10 along a clockwise direction, the set of pressing columns 35 is rotated to align with the pressing head 9C, as the fifth exemplary case of FIG. 4E. While the second driving element 62 drives the switch set 50 to act, the set of pressing columns 35 pushes against the pressing head 9C. Consequently, the pressing head 9C pushes against a corresponding object and the corresponding object performs a specific action. If the first exemplary case of FIG. 4A is regarded as an initial status and the first driving force is provided to drive the first rotation plate 20 and the second rotation plate 30 to rotate selectively 60° relative to the platform 10 along a clockwise direction, the set of pressing columns 35 is rotated to align with the pressing head 9B, as the sixth exemplary case of FIG. 4F. While the second driving element 62 drives the switch set 50 to act, the set of pressing columns 35 pushes against the pressing head 9B. Consequently, the pressing head 9B pushes against a corresponding object and the corresponding object performs a specific action. In the foregoing embodiments, one set of pressing columns 35 of the dual drive pressing apparatus is employed to push against each different one of the plural pressing heads 9A, 9B, 9C, 9D, 9E and 9F, or execute a pressing action at the same one of the plural pressing heads 9A, 9B, 9C, 9D, 9E and 9F in one time or several times. Consequently, the corresponding object performs a specific action. In an embodiment, the second driving element 62 drives the third rotation plate 52 with the inclined plane 53 of the switch set 50 to push against the supporting cylinder 34. Therefore, the third rotation plate 53 is rotated to accomplish a pressing action of the pressing columns 35, but the present disclosure is not limited thereto. It is emphasized that the number and arrangement of the plural pressing heads 9 are not limited to the foregoing embodiments, and they are adjustable according to the practical requirements.

In an embodiment, the number of the plural pressing heads 9 can be for example but not limited to 6, and includes the pressing heads 9A, 9B, 9C, 9D, 9E and 9F. The plural pressing heads 9A, 9B, 9C, 9D, 9E and 9F can be disposed in for example but not limited to plural receiving slots (not shown) of a carrying seat, and arranged on an annular path simultaneously. While the second rotation plate 30 of the dual drive pressing apparatus 1 is rotated, the at least one set of pressing columns 35 on the second rotation plate 30 are moved along the annular path where the plural pressing heads 9 arranged thereon. Consequently, while the first rotation plate 20 rotates with the second rotation plate 30 to the specific angle, the set of pressing columns 35 is moved to align with the corresponding pressing head set selected from the plural pressing heads 9. For example, the plural pressing heads 9A, 9B, 9C, 9D, 9E and 9F are arranged clockwisely around a circumference, and each adjacent two of the plural pressing heads 9A, 9B, 9C, 9D, 9E and 9F form an identical central angle, for example 60°. On the other hand, the dual drive pressing apparatus 1 includes plural pressing columns 35. For example, the dual drive pressing apparatus 1 includes the plural pressing columns 35*a*, 35*b*, 35*c*, 35*d*, 35*e* and 35*f*, and the plural pressing columns 35*a*, 35*b*, 35*c*, 35*d*, 35*e* and 35*f* are arranged clockwisely around a circumference and located on the circumference where the plural pressing heads 9A, 9B, 9C, 9D, 9E and 9F are arranged thereon. The central angles between each adjacent two of the plural pressing columns 35*a*, 35*b*, 35*c*, 35*d*, 35*e* and 35*f* are 20°, 20°, 120°, 40° and 80° along the counter-clockwise direction sequentially.

Figure 5A:
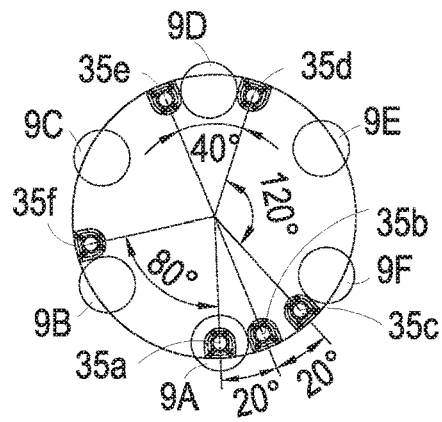
FIGS. 5A to 5K show first to eleventh exemplary cases of relative positions between plural pressing heads and plural sets of pressing columns.
Figure 5B:
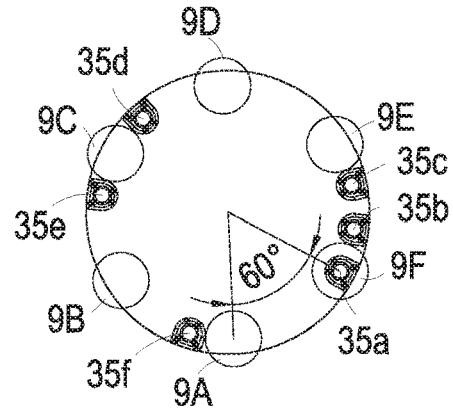
Figure 5C:
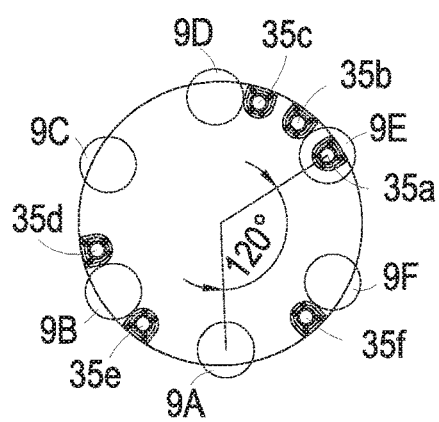
Figure 5D:
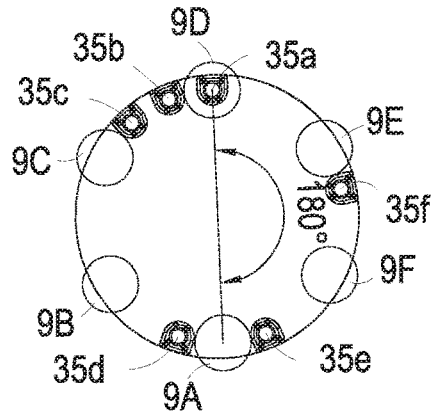
Figure 5E:
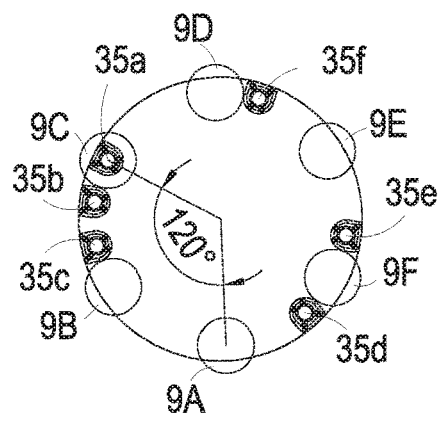
Figure 5F:
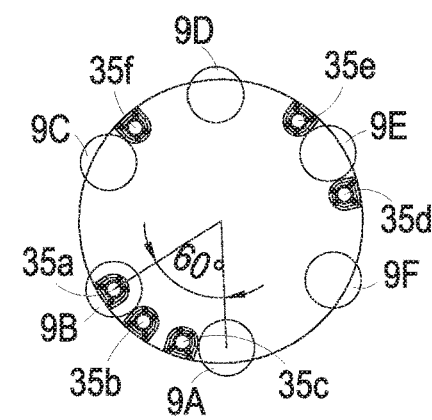

FIGS. 5A to 5K show first to eleventh exemplary cases of relative positions between plural pressing heads and plural sets of pressing columns. FIG. 5A shows the first exemplary case of relative positions between plural pressing heads and the sets of pressing columns. In the first exemplary case as shown in FIG. 5A, there is the pressing column 35*a* aligned with the pressing head 9A merely. The other pressing columns 35*b*, 35*c*, 35*d*, 35*e* and 35*f* are not aligned with the pressing heads 9B, 9C, 9D, 9E and 9F. Namely, the other pressing columns 35*b*, 35*c*, 35*d*, 35*e* and 35*f* and the pressing heads 9B, 9C, 9D, 9E and 9F are misaligned. While the second driving element 62 drives the switch set 50 to act, the pressing column 35*a* pushes against the pressing head 9A merely. Consequently, the pressing head 9A pushes against a corresponding object (not shown) to perform a specific action. If the first exemplary case of FIG. 5A is regarded as an initial status and the first driving force is provided to drive the first rotation plate 20 and the second rotation plate 30 to rotate selectively 60° relative to the platform 10 along a count clockwise direction, the pressing column 35*a* is rotated to align with the pressing head 9F but the other pressing columns 35*b*, 35*c*, 35*d*, 35*e* and 35*f* are not aligned with the pressing heads 9B, 9C, 9D, 9E and 9A, as the second exemplary case of FIG. 5B. While the second driving element 62 drives the switch set 50 to act, the pressing column 35*a* pushes against the pressing head 9F merely. Consequently, the pressing head 9F pushes against a corresponding object and the corresponding object performs a specific action. Similarly, if the first exemplary case of FIG. 5A is regarded as an initial status and the first driving force is provided to drive the first rotation plate 20 and the second rotation plate 30 to rotate selectively 120° relative to the platform 10 along a count clockwise direction, the pressing column 35*a* is rotated to align with the pressing head 9E but the other pressing columns 35*b*, 35*c*, 35*d*, 35*e* and 35*f* are not aligned with the pressing heads 9B, 9C, 9D, 9A and 9F, as the third exemplary case of FIG. 5C. While the second driving element 62 drives the switch set 50 to act, the pressing column 35*a* pushes against the pressing head 9E merely. Consequently, the pressing head 9E pushes against a corresponding object and the corresponding object performs a specific action. If the first exemplary case of FIG. 5A is regarded as an initial status and the first driving force is provided to drive the first rotation plate 20 and the second rotation plate 30 to rotate selectively 180° relative to the platform 10, the pressing column 35*a* is rotated to align with the pressing head 9D but the other pressing columns 35*b*, 35*c*, 35*d*, 35*e* and 35*f* are not aligned with the pressing heads 9B, 9C, 9A, 9E and 9F, as the fourth exemplary case of FIG. 5D. While the second driving element 62 drives the switch set 50 to act, the pressing column 35*a* pushes against the pressing head 9D merely. Consequently, the pressing head 9D pushes against a corresponding object and the corresponding object performs a specific action. If the first exemplary case of FIG. 5A is regarded as an initial status and the first driving force is provided to drive the first rotation plate 20 and the second rotation plate 30 to rotate selectively 120° relative to the platform 10 along a clockwise direction, the pressing column 35*a* is rotated to align with the pressing head 9C but the other pressing columns 35*b*, 35*c*, 35*d*, 35*e* and 35*f* are not aligned with the pressing heads 9B, 9A, 9D, 9E and 9F, as the fifth exemplary case of FIG. 5E. While the second driving element 62 drives the switch set 50 to act, the pressing column 35*a* pushes against the pressing head 9C merely. Consequently, the pressing head 9C pushes against a corresponding object and the corresponding object performs a specific action. If the first exemplary case of FIG. 5A is regarded as an initial status and the first driving force is provided to drive the first rotation plate 20 and the second rotation plate 30 to rotate selectively 60° relative to the platform 10 along a count clockwise direction, the pressing column 35*a* is rotated to align with the pressing head 9B but the other pressing columns 35*b*, 35*c*, 35*d*, 35*e* and 35*f* are not aligned with the pressing heads 9A, 9C, 9D, 9E and 9F, as the third exemplary case of FIG. 5F. While the second driving element 62 drives the switch set 50 to act, the pressing column 35*a* pushes against the pressing head 9B merely. Consequently, the pressing head 9B pushes against a corresponding object and the corresponding object performs a specific action.

Figure 5G:
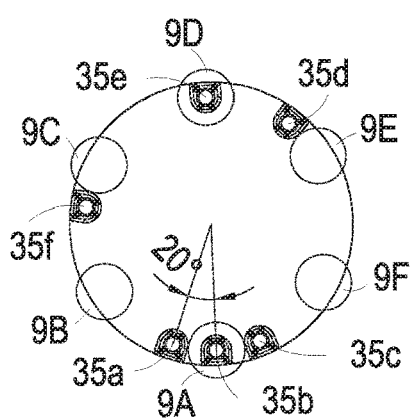
Figure 5H:
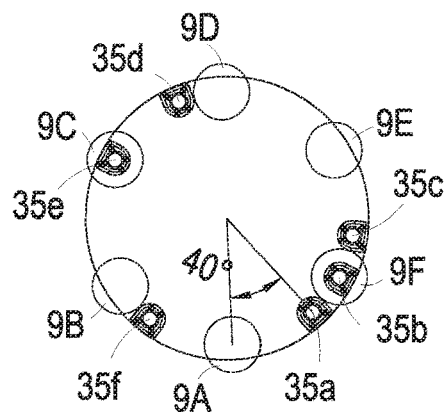
Figure 5I:
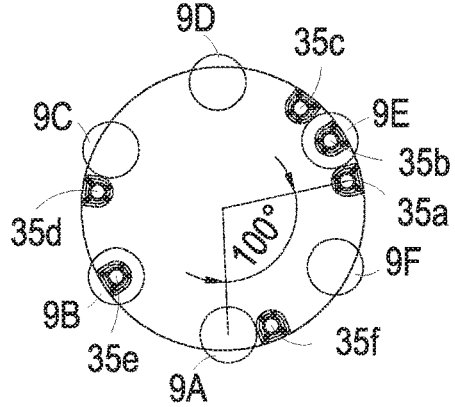
Figure 5J:
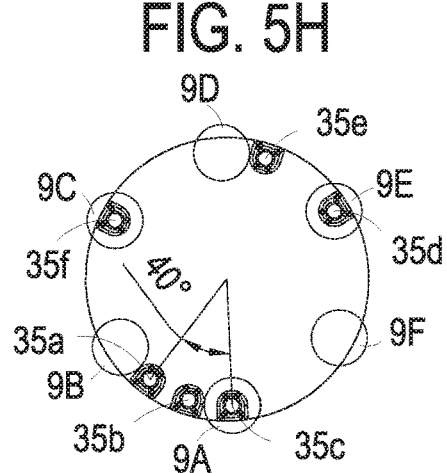
Figure 5K:
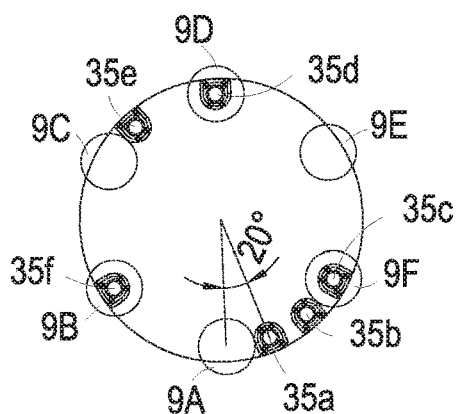

In addition, if the first exemplary case of FIG. 5A is regarded as an initial status and the first driving force is provided to drive the first rotation plate 20 and the second rotation plate 30 to rotate selectively 20° relative to the platform 10 along a clockwise direction, the pressing columns 35*b* and 35*e* are rotated to align with the pressing heads 9A and 9D but the other pressing columns 35*a*, 35*c*, 35*d* and 35*f* are not aligned with the pressing heads 9B, 9C, 9E and 9F, as the seventh exemplary case of FIG. 5G. While the second driving element 62 drives the switch set 50 to act, the pressing columns 35*b* and 35*e* push against the pressing heads 9A and 9E respectively. Consequently, the pressing heads 9A and 9D push against two corresponding objects and the corresponding objects perform the specific actions, simultaneously. Alternatively, if the first exemplary case of FIG. 5A is regarded as an initial status and the first driving force is provided to drive the first rotation plate 20 and the second rotation plate 30 to rotate selectively 40° relative to the platform 10 along a count clockwise direction, the pressing columns 35*b* and 35*e* are rotated to align with the pressing heads 9F and 9C but the other pressing columns 35*a*, 35*c*, 35*d* and 35*f* are not aligned with the pressing heads 9A, 9B, 9D and 9E, as the eighth exemplary case of FIG. 5H. While the second driving element 62 drives the switch set 50 to act, the pressing columns 35*b* and 35*e* push against the pressing heads 9F and 9C respectively. Consequently, the pressing heads 9F and 9C push against two corresponding objects and the corresponding objects perform the specific actions, simultaneously. Alternatively, if the first exemplary case of FIG. 5A is regarded as an initial status and the first driving force is provided to drive the first rotation plate 20 and the second rotation plate 30 to rotate selectively 100° relative to the platform 10 along a count clockwise direction, the pressing columns 35*b* and 35*e* are rotated to align with the pressing heads 9E and 9B but the other pressing columns 35*a*, 35*c*, 35*d* and 35*f* are not aligned with the pressing heads 9A, 9C, 9D and 9F, as the ninth exemplary case of FIG. 5I. While the second driving element 62 drives the switch set 50 to act, the pressing columns 35*b* and 35*e* push against the pressing heads 9E and 9B respectively. Consequently, the pressing heads 9E and 9B push against two corresponding objects and the corresponding objects perform the specific actions, simultaneously. Moreover, if the first exemplary case of FIG. 5A is regarded as an initial status and the first driving force is provided to drive the first rotation plate 20 and the second rotation plate 30 to rotate selectively 40° relative to the platform 10 along a clockwise direction, the pressing columns 35*c*, 35*d* and 35*f* are rotated to align with the pressing heads 9A, 9E and 9C but the other pressing columns 35*a*, 35*b* and 35*e* are not aligned with the pressing heads 9B, 9D and 9F, as the tenth exemplary case of FIG. 5J. While the second driving element 62 drives the switch set 50 to act, the pressing columns 35*c*, 35*d* and 35*f* push against the pressing heads 9A, 9E and 9C respectively. Consequently, the pressing heads 9A, 9E and 9C push against three corresponding objects and the corresponding objects perform the specific actions, simultaneously. If the first exemplary case of FIG. 5A is regarded as an initial status and the first driving force is provided to drive the first rotation plate 20 and the second rotation plate 30 to rotate selectively 20° relative to the platform 10 along a count clockwise direction, the pressing columns 35c, 35d and 35f are rotated to align with the pressing heads 9F, 9D and 9B but the other pressing columns 35a, 35b and 35e are not aligned with the pressing heads 9A, 9C and 9E, as the eleventh exemplary case of FIG. 5K. While the second driving element 62 drives the switch set 50 to act, the pressing columns 35c, 35d and 35f push against the pressing heads 9F, 9D and 9B respectively. Consequently, the pressing heads 9F, 9D and 9B push against three corresponding objects and the corresponding objects perform the specific actions, simultaneously. It is emphasized that the exemplary cases of FIGS. 5A to 5K can be switched freely by the first driving force driving the first rotation plate 20 and the second rotation plate 30 to rotate selectively. The switching order and rotation angle for the plural pressing columns are adjustable according to the practical requirements, and the present disclosure is not limited to the aforementioned switching of the exemplary cases. It is noted that from the first exemplary case of FIG. 5A to the sixth exemplary case of FIG. 5F, the single pressing column 35a is performed to push against one of the plural pressing heads 9A, 9B, 9C, 9D, 9E and 9F merely. Form the seventh exemplary case of FIG. 5G to the ninth exemplary case of FIG. 5I, the two pressing columns 35b and 35e are performed to push simultaneously against two opposite pressing heads 9A and 9D, 9B and 9E, or 9C and 9F on the circumference. Alternatively, in the tenth exemplary case of FIG. 5J and the eleventh exemplary case of FIG. 5K, three pressing columns 35c, 35d and 35f are performed to push simultaneously against three triangular-distribution pressing heads 9A, 9C and 9E or 9B, 9D and 9F on the circumference. Namely, the at least one set of pressing columns 35 on the second rotation plate 30 can be further divided into three sets of the pressing columns for pressing different numbers of pressing heads 9. Each set of the pressing columns 35 has the number less than that of the plural pressing heads 9. Certainly, in an embodiment, the second rotation plate 30 can be included for example but not limited to plural sets of the pressing columns 35 and each set of the pressing columns 35 is employed to perform different pressing operations for pushing against such as a single pressing head, two opposite pressing heads, three triangular-distribution pressing heads and so on. Namely, the number and the position of the pressing columns 35 are adjustable according to the practical requirements and the present disclosure is not limited to the foregoing exemplary cases.

On the other hand, the pressing columns 35 not only can be designed to push against the different numbers of the pressing heads 9 simultaneously, the pressing columns 35 but also can be designed to improve the switching efficiency. FIGS. 6A to 6F show twelfth to seventeenth exemplary cases of relative positions between plural pressing heads and plural sets of pressing columns. In the twelfth exemplary case of FIG. 6A, the number of the plural pressing heads 9 can be for example but not limited to 6, and includes the pressing heads 9A, 9B, 9C, 9D, 9E and 9F. The plural pressing heads 9A, 9B, 9C, 9D, 9E and 9F can be disposed in for example but not limited to plural receiving slots (not shown) of a carrying seat, and arranged on an annular path simultaneously. While the second rotation plate 30 of the dual drive pressing apparatus 1 is rotated, the at least one set of pressing columns 35 on the second rotation plate 30 are moved along the annular path where the plural pressing heads 9 arranged thereon. Consequently, while the first rotation plate 20 rotates with the second rotation plate 30 to the specific angle, the set of pressing columns 35 is moved to align with a part of pressing heads selected from the plural pressing heads 9. For example, the plural pressing heads 9A, 9B, 9C, 9D, 9E and 9F are arranged clockwisely around a circumference, and each adjacent two of the plural pressing heads 9A, 9B, 9C, 9D, 9E and 9F form an identical central angle, for example 60°. On the other hand, the plural pressing columns 35 includes the three pressing columns 35a, 35b and 35c, and the plural pressing columns are arranged clockwisely around a circumference and located on the circumference where the plural pressing heads 9A, 9B, 9C, 9D, 9E and 9F are arranged thereon. The central angles between each adjacent two of the plural pressing columns 35a, 35b and 35c are 160° and 100° along the counterclockwise direction sequentially.

Figure 6A:
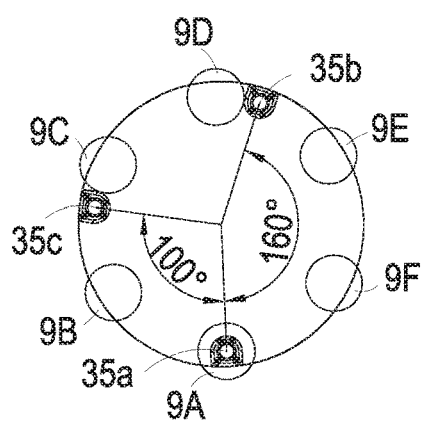
FIGS. 6A to 6F show twelfth to seventeenth exemplary cases of relative positions between plural pressing heads and plural sets of pressing columns.
Figure 6B:
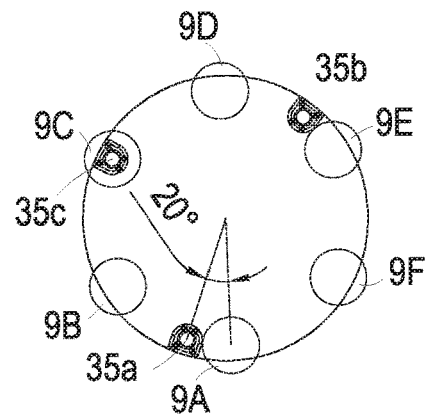
Figure 6C:
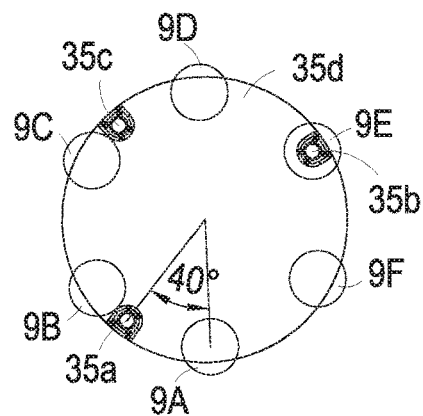
Figure 6D:
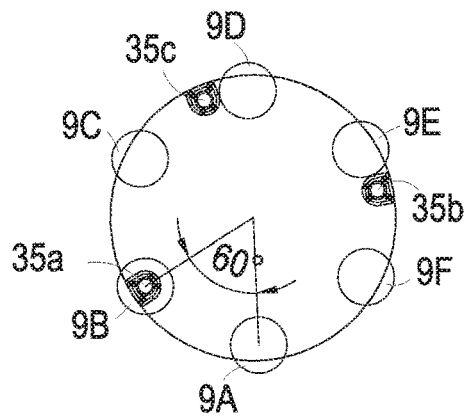
Figure 6E:
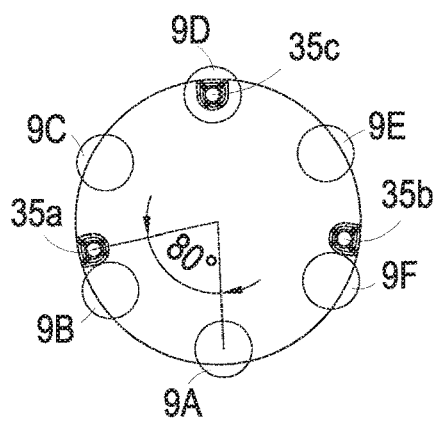
Figure 6F:
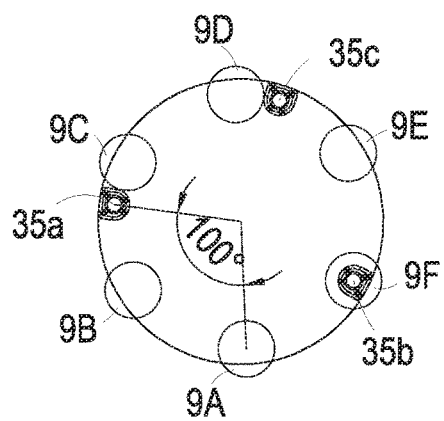

In the twelfth exemplary case as shown in FIG. 6A, the pressing column 35a is aligned with the pressing head 9A merely. The other pressing columns 35b and 35c are not aligned with the pressing heads 9B, 9C, 9D, 9E and 9F. While the second driving element 62 drives the switch set 50 to act, the pressing column 35a pushes against the pressing head 9A merely. Consequently, the pressing head 9A pushes against a corresponding object and the corresponding object performs a specific action. If the twelfth exemplary case of FIG. 6A is regarded as an initial status and the first driving force is provided to drive the first rotation plate 20 and the second rotation plate 30 to rotate selectively 20° relative to the platform 10 along a clockwise direction, the pressing column 35c is rotated to align with the pressing head 9C but the other pressing columns 35a and 35b are not aligned with the pressing heads 9A, 9B, 9D, 9E and 9F, as the thirteenth exemplary case of FIG. 6B. While the second driving element 62 drives the switch set 50 to act, the pressing column 35a pushes against the pressing head 9C merely. Consequently, the pressing head 9C pushes against a corresponding object and the corresponding object performs a specific action. If the twelfth exemplary case of FIG. 6A is regarded as an initial status and the first driving force is provided to drive the first rotation plate 20 and the second rotation plate 30 to rotate selectively 40° relative to the platform 10 along a clockwise direction, the pressing column 35b is rotated to align with the pressing head 9E but the other pressing columns 35a and 35c are not aligned with the pressing heads 9A, 9B, 9C, 9D and 9F, as the fourteenth exemplary case of FIG. 6C. While the second driving element 62 drives the switch set 50 to act, the pressing column 35a pushes against the pressing head 9E merely. Consequently, the pressing head 9E pushes against a corresponding object and the corresponding object performs a specific action. If the twelfth exemplary case of FIG. 6A is regarded as an initial status and the first driving force is provided to drive the first rotation plate 20 and the second rotation plate 30 to rotate selectively 60° relative to the platform 10 along a clockwise direction, the pressing column 35a is rotated to align with the pressing head 9B but the other pressing columns 35b and 35c are not aligned with the pressing heads 9A, 9C, 9D, 9E and 9F, as the fifteenth exemplary case of FIG. 6D. While the second driving element 62 drives the switch set 50 to act, the pressing column 35a pushes against the pressing head 9B merely. Consequently, the pressing head 9B pushes against a corresponding object and the corresponding object performs a specific action. If the twelfth exemplary case of FIG. 6A is regarded as an initial status and the first driving force is provided to drive the first rotation plate 20 and the second rotation plate 30 to rotate selectively 80° relative to the platform 10 along a clockwise direction, the pressing column 35c is rotated to align with the pressing head 9D but the other pressing columns 35a and 35b are not aligned with the pressing heads 9A, 9B, 9C, 9E and 9F, as the sixteenth exemplary case of FIG. 6E. While the second driving element 62 drives the switch set 50 to act, the pressing column 35c pushes against the pressing head 9D merely. Consequently, the pressing head 9D pushes against a corresponding object and the corresponding object performs a specific action. If the twelfth exemplary case of FIG. 6A is regarded as an initial status and the first driving force is provided to drive the first rotation plate 20 and the second rotation plate 30 to rotate selectively 100° relative to the platform 10 along a clockwise direction, the pressing column 35b is rotated to align with the pressing head 9F but the other pressing columns 35a and 35c are not aligned with the pressing heads 9A, 9B, 9C, 9D and 9E, as the seventeenth exemplary case of FIG. 6F. While the second driving element 62 drives the switch set 50 to act, the pressing column 35b pushes against the pressing head 9F merely. Consequently, the pressing head 9F pushes against a corresponding object and the corresponding object performs a specific action.

It is emphasized that the exemplary cases of FIGS. 6A to 6F can be switched freely by the first driving force driving the first rotation plate 20 and the second rotation plate 30 to rotate selectively. The switching order and rotation angle for the plural pressing columns are adjustable according to the practical requirements, and the present disclosure is not limited to the aforementioned switching of the exemplary cases. It is noted that from the first exemplary case of FIG. 6A to the sixth exemplary case of FIG. 6F, while one of the three pressing columns 35a, 35b and 35c is selected to push against one of the plural pressing heads 9A, 9B, 9C, 9D, 9E and 9F, the first driving force drives the first rotation plate 20 and the second rotation plate 30 to rotate a specific angle ranged from 0° to 100° for executing the pressing operation of single one of the pressing heads 9A, 9B, 9C, 9D, 9E and 9F arranged in the circumference. The angle, the distance and the time for switching the pressing positions can be reduced effectively and the operation efficiency is improved. Certainly, in other embodiments, the positions and the number of the pressing columns 35 on the second rotation plate 30 are adjustable in respect of the number and the positions of the plural pressing heads 9. The present disclosure is not limited to the foregoing exemplary cases and not redundantly described herein.

In an embodiment, the dual drive pressing apparatus 1 can be disposed in a feeding equipment and the corresponding objects can be pressing type feeding bottles. Each pressing type feeding bottle contains a specific liquid or an emulsion material therein. Moreover, the pressing type feeding bottle is detachably disposed in the housing of the feeding equipment. In addition, the plural pressing heads 9 of the feeding equipment are corresponding to the plural pressing type feeding bottles, respectively. By employing the dual drive pressing apparatus 1 of the present disclosure to drive the plural pressing head 9 of the feeding equipment, the pressing operations for the plural pressing type feeding bottles are selectively accomplished and the operations of selecting and matching several materials relative to usage requirements can be achieved. It is emphasized that the dual drive pressing apparatus 1 of the present disclosure is not limited to be applied in the feeding equipment. Any equipment employing the technique features of the present disclosure can be implemented and incorporated herein.

In summary, the present provides a dual drive pressing apparatus for plural pressing heads. The dual drive pressing has two driving forces implemented to execute a pressing action and a switching of the pressing positions, so as to achieve the purposes of driving at least one set of pressing columns by two driving force to selectively press plural pressing heads. The divided groups, the number and the positions of the pressing column in the dual drive pressing apparatus are designed respect to the number and the positions of the pressing heads. By employing two driving forces, several pressing actions in different configurations are integrated effectively. Consequently, the efficiency of pressing operations is improved, the entire structure is simplified, the size of the apparatus is reduced, the cost is reduced and the reliability is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A dual drive pressing apparatus for plural pressing heads, the dual drive pressing apparatus comprising:
   a platform including a first surface, a second surface and a shaft hole, wherein the first surface and the second surface are opposite to each other;
   a first rotation plate including a pivot portion, a through hole and a first connection set, wherein the first rotation plate is pivotally connected with the platform by the pivot portion, the through hole passes through the pivot portion and aligns with the shaft hole, and the first connection set is disposed on the first rotation plate;
   a second rotation plate mounted on the first rotation plate and including a third surface, a fourth surface, a second connection set, a supporting cylinder and at least one set of pressing columns, wherein the third surface and the fourth surface are opposite to each other, and the at least one set of pressing columns is disposed nearby an edge of the third surface, wherein the supporting cylinder comprises a first end and a second end, the first end and the second end are opposite to each other, the first end is connected with the fourth surface, and the second end of the supporting cylinder passes though the though hole and the shaft hole along a direction from the third surface to the fourth surface, wherein the first rotation plate and the second rotation plate are pivotally connected with the platform, wherein the first connection set and the second connection set are relative to each other, and the first connection set is connected to the second connection set, wherein while the first rotation plate drives the second rotation plate to rotate, the fourth surface of the second rotation plate is limited to move toward or away the first rotation plate, wherein while the first rotation plate is driven by a first driving force, the first rotation plate rotates with the second rotation plate to a selectively specific angle relative to the platform, and the at least one set of pressing columns is aligned with a corresponding pressing head set selected from the plural pressing heads;
   a return set, constructed between the first rotation plate and the second rotation plate and configured to force the fourth surface of the second rotation plate towards the first rotation plate; and a switch set connected to the second end of the supporting cylinder, wherein while a second driving force is provided by the switch set to push against the second end of the supporting cylinder to move towards the second surface, the supporting cylinder of the second rotation plate drives the fourth surface separated from the first rotation plate, and the at least one set of pressing columns on the third surface pushes the corresponding pressing head set.

2. The dual drive pressing apparatus for plural pressing heads according to claim 1, wherein the switch set comprises:
   a fixing shaft including a first end connected to the second surface of the platform; and
   a third rotation plate pivotally connected with a second end of the fixing shaft and comprising an inclined plane connected to the second end of the supporting cylinder, wherein while the return set forces the fourth surface of the second rotation plate to attach with the first rotation plate, the second end of the supporting cylinder pushes against the inclined plane and the third rotation plate is positioned at a first position, wherein while the third rotation plate is driven by the second driving force and rotates around the fixing shaft to a second position, the third rotation plate drives the inclined plane to push against the second end of the supporting cylinder, wherein the supporting cylinder of the second rotation plate drives the fourth surface separated from the first rotation plate, and the at least one set of pressing columns on the third surface pushes the corresponding pressing head set.

3. The dual drive pressing apparatus for plural pressing heads according to claim 2, further comprising a first driving element and a second driving element, wherein the first driving element is connected to the first rotation plate and configured to provide the first driving force to drive the first rotation plate with the second rotation plate to rotate around the pivot portion, wherein the second driving element is connected to the third rotation plate and configured to provide the second driving force to drive the third rotation plate to rotate around the fixing shaft.

4. The dual drive pressing apparatus for plural pressing heads according to claim 2, further comprising a first detecting element and a mark, wherein the mark is disposed on an outer edge of the third rotation plate and the first detecting element is disposed on the second surface of the platform and relative to the mark, so as to detect if the third rotation plate is positioned at the first position or rotated around the fixing shaft to the second position.

5. The dual drive pressing apparatus for plural pressing heads according to claim 1, further comprising a second detecting element and a dial unit, wherein the dial unit is disposed around an outer edge of the first rotation plate or the second rotation plate and the second detecting element is disposed on the first surface of the platform and relative to the dial unit, so as to detect the specific angle of the first rotation plate and the second rotation plate rotated around the pivot portion.

6. The dual drive pressing apparatus for plural pressing heads according to claim 1, wherein the return set includes a spring.

7. The dual drive pressing apparatus for plural pressing heads according to claim 1, wherein the pivot portion is a detachable sleeve and the pivot portion of the first rotation plate is pivotally connected to the platform through the shaft hole.

8. The dual drive pressing apparatus for plural pressing heads according to claim 1, wherein the at least one set of pressing columns correspondingly is aligned with another pressing head set selected from the plural pressing heads before the first rotation plate rotates with the second rotation plate to the selectively specific angle relative to the platform.

9. The dual drive pressing apparatus for plural pressing heads according to claim 1, wherein the at least one set of pressing columns comprises a first set of pressing columns, a second set of pressing columns and a third set of pressing columns, wherein the first set of pressing columns is aligned with the corresponding pressing head set selected form the plural pressing heads and grouped as a first group before the first rotation plate rotates with the second rotation plate to the selectively specific angle relative to the platform, wherein while the first rotation plate rotates with the second rotation plate to the selectively specific angle relative to the platform, the first set of pressing columns shifts away from the corresponding pressing head set grouped as the first group and the second set of pressing columns or the third set of pressing columns is aligned with the corresponding pressing head set selected from the plural pressing heads and grouped as a second group.

10. The dual drive pressing apparatus for plural pressing heads according to claim 9, wherein while the second driving force is provided by the switch set to push against the second end of the supporting cylinder to move towards the second surface, the supporting cylinder of the second rotation plate drives the fourth surface separated from the first rotation plate, wherein the at least one set of pressing columns on the third surface pushes the first pressing head set, or the second set of pressing columns or the third set of pressing columns on the third surface pushes the second corresponding pressing head set.

11. The dual drive pressing apparatus for plural pressing heads according to claim 1, wherein while the second rotation plate is rotated, the at least one set of pressing columns is moved along an annular path, and the plural pressing heads are disposed on the annular path, wherein while the first rotation plate rotates with the second rotation plate to the specific angle relative to the platform, and the at least one set of pressing columns is aligned correspondingly with the corresponding pressing head set selected from the plural pressing heads.

12. The dual drive pressing apparatus for plural pressing heads according to claim 1, wherein the plural pressing heads are arranged around at least one circumference centered on an identical center, and each adjacent two of the plural pressing heads includes a central angle therebetween.

13. The dual drive pressing apparatus for plural pressing heads according to claim 1, wherein the first connection set comprises plural positioning pins and the second connection set comprises plural positioning holes, wherein the positioning pins and the positioning holes are relative to each other, respectively, and each of the plural positioning pins includes an end inserted in the corresponding positioning hole.

\* \* \* \* \*